(12) United States Patent
Mukherji (10) Patent No.: US 11,685,136 B2
(45) Date of Patent: Jun. 27, 2023

(54) COST-EFFECTIVE AND ECO-FRIENDLY COMPOSITE PRODUCT WITH ROBUST IMPACT STRENGTH

(71) Applicant: SP Advanced Engineering Materials Pvt. Ltd., Mumbai (IN)

(72) Inventor: Arindam Mukherji, Thane (IN)

(73) Assignee: SP Advanced Engineering Materials Pvt. Ltd., Mumbai (IN)

( * ) Notice: Subject to any disclaimer, the term of this patent is extended or adjusted under 35 U.S.C. 154(b) by 29 days.

(21) Appl. No.: 17/314,346

(22) Filed: May 7, 2021

(65) Prior Publication Data
US 2021/0347143 A1 Nov. 11, 2021

(30) Foreign Application Priority Data
May 7, 2020 (IN) .............................. 202021019490

(51) Int. Cl.
*B32B 3/14* (2006.01)
*C08J 5/24* (2006.01)
(Continued)

(52) U.S. Cl.
CPC .............. *B32B 3/14* (2013.01); *B29C 43/003* (2013.01); *B29C 43/203* (2013.01); *B29C 65/62* (2013.01); *B29C 66/721* (2013.01); *B29C 70/46* (2013.01); *B32B 5/024* (2013.01); *B32B 5/263* (2021.05); *B32B 7/09* (2019.01); *B32B 25/10* (2013.01); *C08J 5/244* (2021.05); *B29K 2063/00* (2013.01); *B29K 2067/00* (2013.01); *B29K 2067/003* (2013.01); *B29K 2309/08* (2013.01); *B29K 2623/065* (2013.01); *B29L 2009/00* (2013.01); *B32B 2260/021* (2013.01); *B32B 2260/046* (2013.01); *B32B 2262/0253* (2013.01); *B32B 2262/101* (2013.01);

(Continued)

(58) Field of Classification Search
CPC .......... B32B 3/14; B32B 5/024; B32B 5/263; B32B 7/09; B32B 25/10; B32B 2260/021; B32B 2260/046; B32B 2262/0253; B32B 2262/101; B32B 2272/00; B32B 2307/558
See application file for complete search history.

(56) References Cited

U.S. PATENT DOCUMENTS 5,480,706 A * 1/1996 Li .............................. B32B 5/12
428/920
2015/0274587 A1* 10/2015 Barthelat ............ C03C 23/0025
65/102
2016/0304275 A1* 10/2016 Williams ............... D03D 15/46

FOREIGN PATENT DOCUMENTS

EP          558637 B1 *  6/1998  ............... B32B 3/14
KR       200282228 Y1 *  7/2002  .............. B32B 27/08
WO      WO-9106823 A2 *  5/1991  ............... B32B 3/14

OTHER PUBLICATIONS

[NPL-1] Kim (KR 200282228 Y1); Jul. 2002 (Google Patents Machine Translation to English). (Year: 2002).*

* cited by examiner

Primary Examiner — Frank J Vineis
Assistant Examiner — Donald M Flores, Jr.
(74) Attorney, Agent, or Firm — Ryan Alley IP (57) ABSTRACT

A composite product substantially reduced the impact force imposed by hard impactor which travelled at the speed in the range of 400 m/s to 1400 m/s simultaneously damping the vibrations and shocks appeared therein is disclosed. At the same time it is light weight with the weight lower than that of 22 to 38 kg/m2and is flexible to adopt the shape suitable for the end applications. A method of manufacturing the composite product of the invention is also disclosed.

13 Claims, 2 Drawing Sheets

(51) Int. Cl.
  *B32B 5/02*    (2006.01)
  *B32B 5/26*    (2006.01)
  *B32B 7/12*    (2006.01)
  *B32B 25/10*   (2006.01)
  *B32B 7/09*    (2019.01)
  *B29C 43/20*   (2006.01)
  *B29C 43/00*   (2006.01)
  *B29C 70/46*   (2006.01)
  *B29C 65/62*   (2006.01)
  *B29C 65/00*   (2006.01)
  B29K 63/00     (2006.01)
  B29K 67/00     (2006.01)
  B29K 309/08    (2006.01)
  B29K 623/00    (2006.01)
  B29L 9/00      (2006.01)

(52) U.S. Cl.
  CPC ..... *B32B 2272/00* (2013.01); *B32B 2307/558* (2013.01); *C08J 2363/00* (2013.01)

COST-EFFECTIVE AND ECO-FRIENDLY COMPOSITE PRODUCT WITH ROBUST IMPACT STRENGTH

RELATED APPLICATIONS

This application claims priority under 35 U.S.C. § 119 to IN Application 202021019490, filed May 7, 2020 such IN Application also being incorporated by reference herein in its entirety.

FIELD

The present invention in general relates to the material engineering technology field.

BACKGROUND

The present invention is an improvement over the composite products claimed in the Indian Patent Application No. 201621020446 filed on 15 Jun. 2016 (also published as WO2017/216809) and Indian Patent Application No. 201821031691 filed on 24 Aug. 2018. The prior art references mentioned therein, the composite products and the pultrusion process for continuous production of the composite pultruded products from the said patent applications are incorporated herein entirety as reference.

The composite product disclosed in the Indian Patent Application No. 201621020446 filed on 15 Jun. 2016 (and the related PCT publication WO2017/216809 published on 21 Dec. 2017) has impact strength in the range of 50 to 79 MPa. This is not sufficient for certain applications which need to impede impactors or projectiles travelling at high speed or in aerospace, automotive, construction, any other applications, etc.

To improve the impact strength and to reduce the weight, we had developed the honeycomb closed cellular product having robust impact resistance yet being light weight and lower in cost which is very well disclosed in Indian Patent Application No. 201821031691 filed on 24 Aug. 2018. The composite product disclosed therein has the reduced stress in the range of 601 to 691.85 MPa and deformation of 466.52 to 551.37 mm which reflects robust impact resistance and shock dissipation. However, this product is not flexible.

In the applications such as aerospace, automotive, construction, and to the articles which impede impactors or projectiles travelling at high speed, etc, fracture mechanisms during high-speed impact are very complicated and occur in an extremely short time; therefore, no single property has direct correlation with high impact performance. Microstructural features, such as grains, strongly influence crack propagation and energy dissipation mechanisms, hence they affect the high impact performance. Therefore, these features must be also considered in addition to material properties. Research is continuously being carried out to enhance the performance simultaneously reducing weight by improving the dissipation of the impact energy, minimising the damage area and damping of the vibration and shock appeared by high impact.

Thus, there is continuous need to develop a composite product which substantially reduces the impact force and damps the vibrations and shocks appeared by high impact at the same time it is light weight and flexible to adopt the shape suitable for end applications.

SUMMARY

Thus, a primary object of the present invention is to provide a composite product which substantially reduces the impact force of the high-speed projectiles or impactors and damps the vibrations and shock appeared by the impact of the high-speed projectiles or impactors at the same time it is light weight and flexible to adopt the shape suitable for end applications.

Another object of the present invention is to provide the composite product which substantially reduces the impact force imposed by the hard projectiles or impactors which travels at the speed in the range of 400 m/s to 1400 m/s simultaneously damping the vibrations and shock appeared therein.

Yet another object of the present invention is to provide the composite product which uses waste such as recycled polyethylene terephthalate (PET) bottle felts, used HDPE woven bags and/or sacks and waste of composite product as claimed in Indian Patent Application No. 201621020446, thereby making the invention eco-friendly and green.

Yet another object of the present invention is to provide the composite product which substantially reduces the impact force of the high-speed projectiles or impactors and damps the vibrations and shock appeared by the impact of the high-speed projectiles or impactors at the same time it is light weight and flexible to adopt shape suitable for end applications, wherein the product is cost-effective.

Still another object of the present invention is to provide the composite product which is light weight where the weight does not exceed 25 to 35 kilograms per square meter (kg/m2).

Still yet another object of the present invention is to provide the light weight and flexible panels or the articles of predefined shape and dimension with high impact strength and improved damping behaviour.

An additional object of the present invention is to provide a method of manufacturing the light weight and flexible composite product with high impact strength and improved damping behaviours.

The claimed invention provides a composite product, as defined in claim 1, and further provides a method of manufacturing said composite product, as defined in claim 9.

In one embodiment the composite product includes at least one of layer (a) or layer (b), plus layer (c), plus layer (d). It may usefully be that the first layer is at least one of layer (a) or layer (b); and this first layer is adjacent to a second layer which is layer (d), which is then adjacent to a third layer which is layer (c).

In one embodiment the composite product includes all four of the layers (a)-(d) and also layer (e). In another embodiment the composite product includes only one out of layer (a) or layer (b), plus layer (c), plus layer (d), and also layer (e).

In one embodiment the method includes manufacturing at least one of the layers (a) and (b) by the method steps i) and ii) respectively, and also manufacturing the layers (c) and (d) by the method steps iii) and iv) respectively, and also providing layer (e) by the method step v).

In one embodiment the method is used to make a first layer that is at least one of layer (a) or layer (b) using step i) or ii) respectively; to make a second layer which is layer (d) by method step iv) and where the second layer is adjacent the first layer; and to make a third layer which is layer (c) by method step iii) and where the third layer is adjacent the second layer.

In one embodiment the method includes manufacturing all four of the layers (a)-(d) by the method steps i)-iv) respectively, and also providing layer (e) by the method step v). In another embodiment the method includes manufacturing only one of the layers (a) or (b), by the method step i) or ii) respectively, and also manufacturing the layers (c) and (d) by the method steps iii) and iv) respectively, and also providing layer (e) by the method step v).

Benefits of the claimed composite product include that: the composite product substantially reduces the impact force of the high-speed projectiles and damps the vibrations and shock appeared by the impact of the high-speed projectiles, and at the same time it is light weight and flexible to adopt the shape suitable for the end applications.

Surprisingly, it was found that
1) It is important and critical to use a waste of hybrid composites in powder form to make the first thermoset composite layer to sustain impacts;
2) It is also important and critical to prepare small blocks of predefined shape from the waste powder of hybrid composites or ceramic and these blocks are interlocked to form the first thermoset composite layer which sustain impacts and eliminates weak joint formation;
3) It was observed that when these small blocks of predefined shape are joined simply in X-Y plane direction then the joints formed are fragile and weak and cannot sustain the impact;
4) The shape and configuration of the hexagonal units and their arrangement in X-Y plane direction to form a single layer or an upper layer and or/lower layer; the manner in which these two layers are overlapped so that each common vertex of three adjacent hexagonal units of the one layer is superimposed at the centre of the hexagonal unit of the lower layer; compressing upper layer the several hexagonal units which are surface treated with the bonding agent, the thin compounded rubber middle layer and the lower layer the several hexagonal units which are surface treated with the bonding agent fused by compression moulding without deviating X-Y plane arrangement are very important to achieve impact strength for being the first layer; and
5) It is important to place first, the thermoset composite layer of the waste powder of hybrid composites or ceramic being upper layer or first, a layer (b) of at least one layer comprising several hexagonal units of glass fabric impregnated with epoxy resin being surface treated with bonding agent arranged in a X-Y plane direction fused with a thin layer of compounded rubber being upper layer followed by a layer (d) being a second layer backing to the first layer comprising a layer of the composite product and lastly a composite layer (c) being a third layer (i.e. lower layer) and backing second layer comprising two layers, one layer comprising multiple fused layers of surface treated used HDPE woven bags and/or sacks with a solvent-based elastomeric adhesive layer or stitched multiple layers of used HDPE woven bags and/or sacks and second layer comprising stitched multiple layers of recycled PET bottles felt or mat and finally enclosed the three layers in the specific sequence in the fabric i.e. the specific constructed layer and their sequence;

are critical to achieve the impact strength, improved damping behaviour, flexibility and light weight characteristics of the composite product of the invention.

The composite product of the invention substantially reduces the impact force of the high-speed projectiles and damps the vibrations and shock appeared by the impact of the high-speed projectiles at the same time it is light weight and flexible to adopt the shape suitable for the end applications. Specifically, the composite product of the invention substantially reduces the impact force imposed by the hard impactor which travels at the speed in the range of 400 m/s to 1400 m/s simultaneously damping the vibrations and shock appeared therein. The composite product of the invention is a light weight product with the weight that does not exceed 22 to 38 kg/m2. It is flexible to adopt the shape suitable for the end applications. It has a thickness of at least 22 mm.

According to one of the embodiments of the invention, there is provided the composite product;

said product comprising at least three layers selected from:
(a) a thermoset composite layer (a) made of: a powder of waste hybrid composites or ceramic;
(b) a layer (b) comprising: at least one layer comprising several hexagonal units of glass fabric impregnated with epoxy resin system and being surface treated with bonding agent, arranged in a X-Y plane direction and fused with a thin layer of compounded rubber; or at least two layers that comprise several hexagonal units of glass fabric impregnated with epoxy resin system and being surface treated with bonding agent, arranged in a X-Y plane direction and fused with a thin middle layer of compounded rubber;
(c) a composite layer (c) comprising two layers, wherein a first layer comprises: fused multiple layers of used HDPE woven bags and/or sacks with a solvent-based elastomeric adhesive layer; or stitched multiple layers of used HDPE woven bags and/or sacks; and wherein a second layer comprises: stitched multiple layers of recycled PET bottles, felt or mats;
(d) a planar composite layer (d) made of a composite product comprising: a core of synthetic polyester felt impregnated with a resin system, said core being encapsulated between bi-directionally and/or uni-directionally oriented synthetic fabric which is selected from polyester, carbon, aramid, glass, basalt and mixtures thereof and which is impregnated with a resin system; and further comprising:
(e) an upper superior layer of a fabric, encapsulating said at least three layers selected from layers (a) to (d), to form a composite product;

the composite product substantially reduces the impact force of the high-speed projectiles and damps the vibrations and shock appeared by the impact of the high-speed projectiles at the same time it is light weight and flexible to adopt the shape suitable for the end applications.

Typically, the composite layer (c) comprising two layers, one layer comprising fused/stitched multiple layers of used HDPE woven bags and/or sacks and second layer comprising stitched multiple layers of recycled PET bottles felt or mats; said two layers are stitched together.

Typically, the composite product of the invention comprises first thermoset composite layer (a) of the waste powder of hybrid composites or ceramic being upper layer; or first layer (b) comprising at least one layer or at least two layers comprising several hexagonal units of glass fabric impregnated with the epoxy resin system being surface treated with bonding agent arranged in a X-Y plane direction fused with a thin layer of compounded rubber being upper layer; a second layer backing to the first layer, composite layer (d) of the composite product; and third layer being lower layer and backing second layer, the composite layer (c) comprising two layers, one layer comprising fused/stitched multiple layers of used HDPE woven bags and/or sacks and second layer comprising stitched multiple layers of recycled PET bottles felt or mat.

Typically, the at least three layers are enclosed in the specific sequence in the fabric to obtain the composite product of the invention.

According to another embodiment of the invention, there is provided a method of manufacturing the composite product of the invention; wherein said method comprises manufacturing at least three layers selected from layers (a) to (d), which are prepared according to the steps (i) to (iv) respectively:

i. manufacturing the thermoset composite layer (a) by either compression moulding the powder of the waste hybrid composites along with epoxy resin system, or hot pressing of ceramic, into predefined shaped blocks, followed by interlocking a first set of blocks with a second set of blocks through operatively downward sloping and outward facing planar surfaces;

ii. manufacturing either: the layer (b) comprising at least one layer comprising several hexagonal units of glass fabric impregnated with epoxy resin system being surface treated with bonding agent arranged in a X-Y plane direction fused with a thin layer of compounded rubber by impregnating a glass fabric with epoxy resin system followed by compression moulding or punching to obtain hexagonal units, surface treating of the hexagonal units with a bonding agent, arranging the several hexagonal units surface treated with the bonding agent in the X-Y plane direction where two edges of each hexagonal unit share with two immediate adjacent hexagonal units in X-direction while remaining four edges share with four immediate adjacent hexagonal units placed vertically in the Y-direction to form a layer comprising several hexagonal units, placing one thin layer of the compounded rubber over the layer comprising several hexagonal units and fusing the layer comprising several hexagonal units and the thin compounded rubber by compression moulding; or manufacturing the layer (b) comprising of at least two layers comprising several hexagonal units of glass fabric impregnated with epoxy resin being surface treated with bonding agent arranged in a X-Y plane direction fused with a thin layer of compounded rubber by impregnating a glass fabric with epoxy resin system followed by compression moulding or punching to obtain hexagonal units, surface treating of the hexagonal units with a bonding agent, arranging the several hexagonal units surface treated with the bonding agent in the X-Y plane direction where two edges of each hexagonal unit share with two immediate adjacent hexagonal units in X-direction while remaining four edges share with four immediate adjacent hexagonal units placed vertically in the Y-direction to form a lower and an upper layer comprising several hexagonal units, placing one thin layer of the compounded rubber over the lower followed by placing the upper layer to overlap the lower layer in such a manner that each common vertex of three adjacent hexagonal units of upper layer superimposing at the centre of the hexagonal unit of the lower layer without deviating X-Y plane arrangement and fusing the upper layer, the thin compounded rubber middle layer and the lower layer by compression moulding;

iii. manufacturing the composite layer (c) by: surface treating the layers of used HDPE woven bags and/or sacks with the solvent-based elastomeric adhesive, placing the multiple layers of the surface treated of used HDPE woven bags and/or sacks over each other, followed by compressing and fusing the multiple layers to form one layer, or placing the multiple layers of used HDPE woven bags and/or sacks over each other, followed by stitching to form one layer; superimposing the multiple layers of recycled PET bottles felt or mat over each other, followed by stitching to form a second layer; and superimposing the one layer of compressed and fused surface treated multiple layers of HDPE woven bags or sacks or the one layer of stitched multiple layers of HDPE woven bags or sacks over the second layer of the stitched multiple layers of recycled PET bottles felt or mat, followed by stitching them together;

iv. manufacturing a planar composite layer (d) by encapsulating the synthetic polyester felts impregnated with a resin system as core with bi-directionally and/or uni-directionally oriented synthetic fabric selected from polyester, carbon, aramid, glass, basalt and mixtures thereof impregnated with a resin system by pultrusion or filament winding method; and then v. encapsulating at least three layers, prepared according to the steps (i) to (iv), in a predefined sequence with a fabric as an upper or a superior layer, followed by stitching the fabric to form the composite product;

the composite product substantially reduces the impact force of the high-speed projectiles and damps the vibrations and shock appeared by the impact of the high-speed projectiles at the same time it is light weight and flexible to adopt the shape suitable for the end applications.

Particularly, the present invention relates to a composite product which substantially reduces the impact force of the high-speed projectiles and damps the vibrations and shock appeared by the impact of the high-speed projectiles at the same time it is a light weight and a flexible to adopt a shape suitable for end applications.

The present invention also relates to a method of manufacturing the light weight composite product which substantially reduces the impact force of the high-speed projectiles and damps the vibrations and shock appeared by the impact of the high-speed projectiles at the same time it is flexible to adopt the shape suitable for end applications.

The light weight and flexible composite product with high impact strength and improved damping behaviour is in the form of panels, or an article of predefined shape and dimension. It is used in the applications such as aerospace, automotive, construction, and in the articles which impede impactor or projectiles travelling at high speed, etc..

DETAILED DESCRIPTION

The present invention as described below, it is to be understood that this invention is not limited to particular embodiments, drawings, methodologies and materials described, as these may vary as per the person skilled in the art. It is also to be understood that the terminology used in the description is for the purpose of describing the particular embodiments only and is not intended to limit the scope of the present invention.

Before the present invention is described, it is to be understood that unless defined otherwise, all technical and scientific terms used herein have the same meaning as commonly understood by one of ordinary skill in the art to which this invention belongs. Further, it is to be understood that the present invention is not limited to the methodologies and materials similar or equivalent to those described herein can be used in the practice or testing of the present invention, the preferred methods and materials are described, as these may vary within the specification indicated. Unless stated to the contrary, any use of the words such as "including," "containing," "comprising," "having" and the like, means "including without limitation" shall not be construed to limit any general statement that it follows to the specific or similar items or matters immediately following it. Embodiments of the invention are not mutually exclusive, but may be implemented in various combinations. The described embodiments of the invention and the disclosed examples are given for the purpose of illustration rather than limitation of the invention as set forth the appended claims. Further the terms disclosed embodiments are merely exemplary methods of the invention, which may be embodied in various forms.

It is also to be understood that the terms "a", "an", "the" and like are words for the sake of convenience and are not to be construed as limiting terms. Moreover, it will be understood that the illustrations are for the purpose of describing a particular exemplary embodiment of the invention and are not limited to the invention thereto.

In the applications such as aerospace, automotive, construction, and to an article which impede impactors or projectiles travelling at high speed, etc, fracture mechanisms during high-speed impact are very complicated and occur in an extremely short time; therefore, no single property has direct correlation with high impact performance. Microstructural features, such as grains, strongly influence crack propagation and energy dissipation mechanisms, hence they affect the high impact performance. Therefore, these features must also be considered in addition to material properties. In view of the composite products as disclosed in the Indian Patent Application nos. 201621020446 and 201821031691, we carried out research to improve the mechanical properties like impact strength and improved damping behaviour simultaneously reducing weight and induce flexibility of the composite product.

According to one of the embodiments of the invention, there is provided a composite product which substantially reduces the impact force of the high-speed projectiles and damps the vibrations and shock appeared by the impact of the high-speed projectiles at the same time it is light weight and flexible to adopt the shape suitable for the end applications.

Typically, the composite product of the invention substantially reduces the impact force imposed by the hard impactor which travels at the speed in the range of 400 m/s to 1400 m/s simultaneously damping the vibrations and shock appeared therein.

Typically, the composite product of the invention is a light weight product with the weight that does not exceed 22 to 38 kg/m2.

Typically, the composite product of the invention is flexible to adopt the shape suitable for the end applications.

Typically, the composite product of the invention has a thickness of at least 22 mm.

According to the preferred embodiment of the invention, there is provided the composite product comprising at least three layers selected from a thermoset composite layer
a) (a) made of a powder of waste hybrid composites or ceramic;
b) a layer (b) comprising at least one layer comprising several hexagonal units of glass fabric impregnated with the epoxy resin system being surface treated with bonding agent arranged in a X-Y plane direction fused with a thin layer of compounded rubber or at least two layers that comprises several hexagonal units of glass fabric impregnated with the epoxy resin system being surface treated with bonding agent arranged in a X-Y plane direction fused with a thin middle layer of compounded rubber;
c) a composite layer (c) comprising two layers, one layer comprising fused multiple layers of used HDPE woven bags and/or sacks with a solvent-based elastomeric adhesive layer or stitched multiple layers of used HDPE woven bags and/or sacks and second layer comprising stitched multiple layers of recycled PET bottles felt or mats;
d) a planar composite layer (d) made of the composite product comprising synthetic polyester felts impregnated with a resin system as a core encapsulated between bi-directionally and/or uni-directionally oriented synthetic fabric selected from polyester, carbon, aramid, glass, basalt and mixtures thereof impregnated with a resin system; and
e) an upper superior layer of a fabric encapsulating said at least three layers selected from layers (a) to (d) in a predefined sequence to form a composite product;

said composite product substantially reduces the impact force of the high-speed projectiles and damps the vibrations and shock appeared by the impact of the high-speed projectiles at the same time it is light weight and flexible to adopt the shape suitable for the end applications.

In the present invention, a construction of every layer and their sequence is critical to achieve the impact strength, improved damping behaviour, flexibility and light weight characteristics of the composite product of the invention.

Figure 1A:
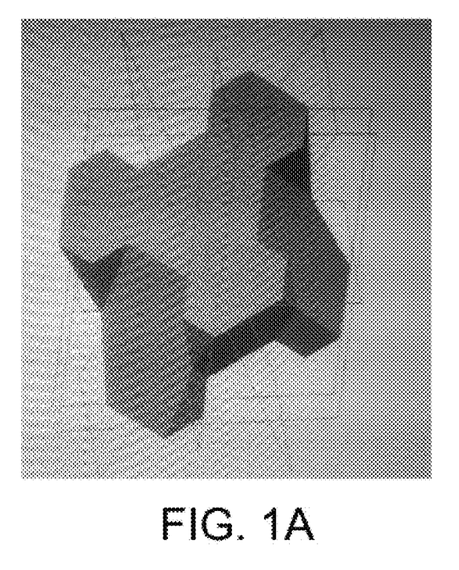
FIG. 1A illustrates the schematic structural diagram of blocks.
Figure 1B:
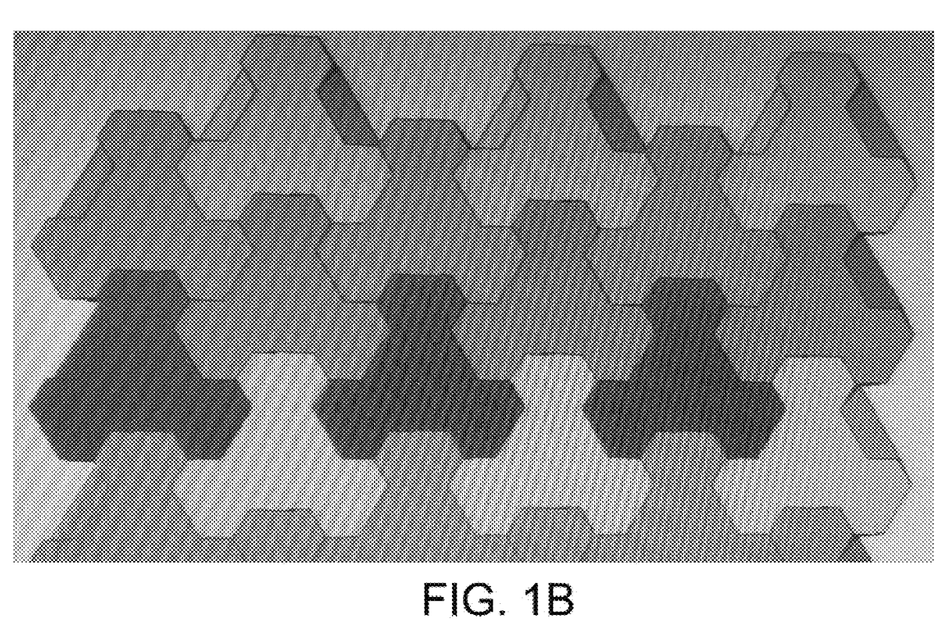
FIG. 1B illustrates the schematic structural diagram of the layer (a) of predefined shaped blocks made up of waste powder generated during the manufacturing of the composite pultruded product as claimed in Indian Patent Application No. 201621020446 or during its use in the end application or by using any other suitable hybrid composites or ceramic.

The thermoset composite layer (a) is a planar layer made up of predefined shaped blocks which are interlocked. These blocks are made up of the waste powder generated during the trimming of the composite pultruded product either during the manufacturing or during its use in the end applications. The powder of the waste composite pultruded product consisting the core comprising the waste synthetic polyester felts impregnated with the resin system and the core is encapsulated between bi-directionally and/or uni-directionally oriented synthetic fabric selected from polyester, carbon, aramid, glass and/or basalt impregnated with a resin system. These blocks are made up of powder of the waste composite pultruded product along with the epoxy resin system or ceramic. The epoxy resin system used in the layer (a) comprises epoxy resin and hardener in the ratio of 100:10 and the resin system is curable at room temperature.

This composite pultruded product was disclosed in Indian Patent Application No. 201621020446.

These predefined shaped blocks made up of the waste powder of the hybrid composites are at least 12 mm thick.

These predefined shaped blocks made up of ceramic are at least 4 mm thick.

These blocks have slots to accommodate similar blocks followed by interlocking first set of blocks with second set of blocks. The design of each block is precisely made to lock one block as male to other as female and vice versa when arranged at flip side to other to obtain the thermoset composite layer (a).

Each block, when considered as an element with a substantially triangular cross section, comprises hexagonal-shaped protrusions instead of a vertex of a triangle with a linear edge at presumed vertex points.

FIG. 1A illustrates the schematic structural diagram of a predefined shaped block.

Each block comprises operatively downward sloping and outward facing planar surfaces between two presumed vertex points or between two hexagonal shaped protrusions, the width-wise edge of the planar surfaces joins two adjacent hexagonal shaped protrusions.

Particularly, the first layer is made up of a first layer comprising a first set of blocks interlocked with a second layer comprising a second set of blocks; the first set of blocks is an inverted set of the second set of blocks and vice versa. The first set of blocks is complementary to the second set of blocks, in that, the mounting of a block from the first set of blocks onto a block from the second set of blocks causing an interlocked block assembly.

Interlocked blocks, when placed adjacent to each other, mesh/interface with each other: at the planar sloping surfaces; and at the linear edges.

This meshing/interfacing cause to form a meshed/interfaced layer such that each block's linear edge, at presumed vertex point, abuts and adjacent width-wise edge of its planar surface.

FIG. 1B illustrates the schematic structural diagram of the first layer made up of plural predefined shaped blocks of the composite pultruded product/the ceramic.

The planar thermoset composite layer (a) made up of the powder of the waste hybrid composites has thickness of at least 12 mm.

The planar thermoset composite layer (a) made up of ceramic has thickness of at least 4 mm.

It is important and critical for the planar thermoset composite layer (a) made up of a waste of hybrid composites, which is in the form of powder. It is also important and critical for the planar thermoset composite layer (a) made up of small blocks of predefined shape which are interlocked to form the layer. It is observed in the present invention, when the layer (a) is made up small blocks by interlocking them, then it sustains impact. Commonly, when these small blocks of predefined shape are joined simply in X-Y plane direction then the joints formed are fragile and weak and cannot sustain the impact. To sustain the impact, it requires strong backing layer. However, when these small blocks of predefined shape are interlocked then it sustains impact; it also eliminates weak joint formation; and does not require backing. It is important and critical for the layer (a) to be made up of ceramic to reduce the weight.

It is to be understood that any person skilled in the art can prepare different shapes of blocks and interlock them to form the composite layer (a) and hence, the scope of the present invention should not be limited to the block of the predefined shape as described in the embodiment of the present invention but intend to include all suitable shapes of the block which are suitable to interlock one block as male to other block as female and vice versa when arranged at flip side to other to obtain the layer.

Figure 2:
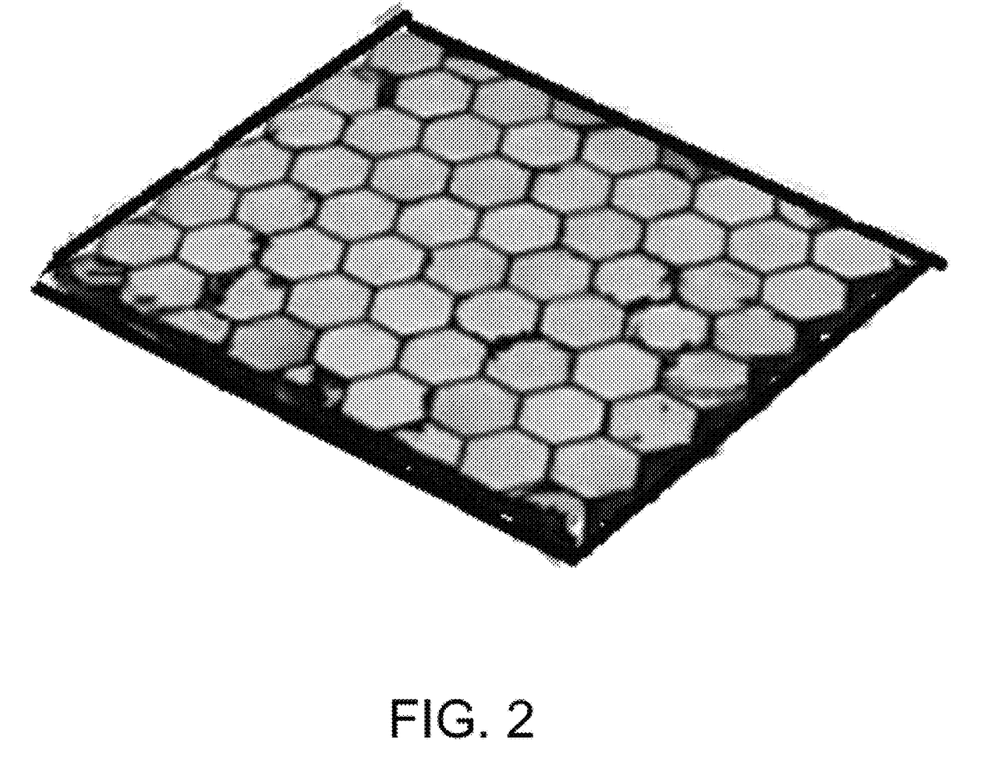
FIG. 2 illustrates the structural diagram of the layer (b) comprising at least two layers comprising several hexagonal units of glass fabric coated with the epoxy resin system arranged in a X-Y plane direction fusing with a thin middle layer of compounded rubber.

The layer (b) comprises at least one layer comprising several hexagonal units of glass fabric impregnated with the epoxy resin system being surface treated with bonding agent arranged in the X-Y plane direction fused with the thin layer of compounded rubber. The hexagonal units are made up of the uni-directional or bi-directional glass fabric impregnated with the epoxy resin system followed by compression moulding or punching or any other conventional technique. Each hexagonal unit has at least 3 mm of thickness and 28 mm of diameter. These hexagonal units are surface treated with the bonding agent including examples but not limited to Chemlok® bonding agent.

Particularly, several hexagonal units which are surface treated with the bonding agent are arranged in X-Y plane direction where two edges of each hexagonal unit share with two immediate adjacent hexagonal units in X-direction while remaining four edges share with four immediate adjacent hexagonal units placed vertically in the Y-direction to form the layer. Over this layer, one thin layer of the compounded rubber is placed. Both these layers are fused by compression moulding.

The layer (b) comprising at least one layer comprising several hexagonal units of glass fabric impregnated with the epoxy resin system being surface treated with bonding agent arranged in the X-Y plane direction fused with the thin layer of compounded rubber has a thickness of at least 6 mm.

The layer (b) comprises upper and lower layers composed of several hexagonal units of glass fabric impregnated with the epoxy resin system being surface treated with bonding agent arranged in the X-Y plane direction fused with the thin middle layer of the compounded rubber sandwiched between the upper and the lower layers. The hexagonal units are made up of the uni-directional or bi-directional glass fabric impregnated with the epoxy resin system by compression moulding or punching or any other conventional technique. Each hexagonal unit has at least 3 mm of thickness and 28 mm of diameter. These hexagonal units are surface treated with the bonding agent including examples but not limited to Chemlok® bonding agent.

Particularly, several hexagonal units which are surface treated with the bonding agent are arranged in X-Y plane direction where two edges of each hexagonal unit share with two immediate adjacent hexagonal units in X-direction while remaining four edges share with four immediate adjacent hexagonal units placed vertically in the Y-direction to form the lower layer. Over this layer, one thin layer of the compounded rubber is placed. Over this rubber middle layer, several hexagonal units which are surface treated with the bonding agent are arranged in X-Y plane direction to form the upper layer. The arrangement of the upper layer and lower layer is in such a manner that each common vertex of three adjacent hexagonal units of the one layer is overlapped to superimpose at the centre of the hexagonal unit of the lower layer without deviating X-Y plane arrangement.

Particularly, these layers i.e. upper layer the several hexagonal units which are surface treated with the bonding agent, the thin compounded rubber middle layer and the lower layer the several hexagonal units which are surface treated with the bonding agent are fused by compression moulding.

The thin layer of the compounded rubber is 1 mm thick and calendered compounded rubber. The compounded rubber is either natural or synthetic.

The layer (b) comprising upper and lower layers composed of several hexagonal units of glass fabric impregnated with the epoxy resin system being surface treated with bonding agent arranged in X-Y plane direction fused with the thin middle layer of the compounded rubber has thickness of at least 12 mm.

The bonding agent used in the layer (b) includes but not limited to Chemlok®.

The epoxy resin system used in the layer (b) comprises epoxy resin and hardener in the ratio of 100:10 and the system is curable at room temperature.

The layer (b) has a thickness of at least 6 to 12 mm.

FIG. 2 illustrates the structural diagram of the second layer comprising the upper and lower layer comprising several hexagonal units of glass fabric impregnated with the epoxy resin system being surface treated with bonding agent arranged in the X-Y plane direction fused with the thin middle layer of compounded rubber.

The shape and configuration of the hexagonal units and their arrangement in X-Y plane direction to form the upper layer and lower layer; the manner in which these two layers are overlapped so that each common vertex of three adjacent hexagonal units of the one layer is superimposed at the centre of the hexagonal unit of the lower layer; compressing the upper layer comprising the several hexagonal units which are surface treated with the bonding agent, the thin middle compounded rubber layer and the lower layer comprising the several hexagonal units which are surface treated with the bonding agent fused by compression moulding without deviating X-Y plane arrangement are very important to achieve impact strength.

The layer (c) consisting of two layers wherein one of the two layers comprising compressed and fused multiple layers of used HDPE woven bags and/or sacks with the solvent-based elastomeric adhesive layer or stitched multiple layers of used HDPE woven bags and/or sacks and second of the two layers comprising stitched multiple layers of recycled PET bottles felt or mat. These two layers are stitched to form the composite layer (c).

The compressed and fused multiple layers of used HDPE woven bags and/or sacks with the solvent-based elastomeric adhesive layer comprises multiple layers of the surface treated used HDPE woven bags and/or sacks with the solvent-based elastomeric adhesive which were compressed and fused.

The stitched multiple layers of used HDPE woven bags and/or sacks comprises multiple layers of used HDPE woven bags and/or sacks which are stitched together.

The stitched multiple layers of recycled PET bottles felt or mat comprises multiple layers of recycled PET bottles felts or mats which are stitched together.

In one of the embodiments of the invention, the layer (c) comprises compressed and fused multiple layers of used HDPE woven bags and/or sacks with the solvent-based elastomeric adhesive layer or stitched multiple layers of used HDPE woven bags and/or sacks as an upper layer and stitched multiple layers of recycled PET bottles felt or mat as a lower layer; said upper layer and said lower layer are stitched together.

In another embodiment of the invention, the layer (c) comprises stitched multiple layers of recycled PET bottles felt or mat as the upper layer and compressed and fused multiple layers of used HDPE woven bags and/or sacks with the solvent-based elastomeric adhesive layer or stitched multiple layers of used HDPE woven bags and/or sacks as the lower layer; said upper layer and said lower layer are stitched together.

In yet another embodiment of the invention, the layer (c) comprises compressed and fused multiple layers of used HDPE woven bags and/or sacks with the solvent-based elastomeric adhesive layer or stitched multiple layers of used HDPE woven bags and/or sacks as a first layer and stitched multiple layers of recycled PET bottles felt or mat as a second layer; said first layer and said second layer are arranged in alternate manner and these layers are stitched together.

The recycled waste PET bottles felts or mats has 500 grams per square meter (GSM).

The solvent-based elastomeric adhesive used in the layer (c) is any liquid elastomeric adhesive including but not limited to SPEB-7.

The layer (c) has a thickness of at least 8 mm.

The layer (d) is the fibre reinforced composite layer comprising synthetic polyester felts impregnated with the resin system as core encapsulated between bi-directionally and/or uni-directionally oriented synthetic fabric selected from polyester, carbon, aramid, glass, basalt and mixtures thereof impregnated with the resin system.

This fibre reinforced composite layer (d) is manufactured by pultrusion method or filament winding method or any other conventional method.

This layer (d) has a thickness of at least 8 mm.

The synthetic polyester felts or mats are prepared by placing multiple layers of recycled PET bottle felts followed by stitching. The recycled waste PET bottles felts or mats are prepared from waste PET bottles. The synthetic polyester felts have 500 GSM.

At least three layers selected from the layers (a) to layers (d) are arranged in the predefined sequence and encapsulated with the fabric as the upper and superior layer to form composite product of the invention. The fabric used is either natural fabric or synthetic fabric including but not limited to cotton, nylon, terylene, polyester, rubberized fabric, blends, etc.

According to the present invention, there is provided the method of manufacturing the composite product of the invention which substantially reduces the impact force of the high-speed projectiles and damps the vibrations and shock appeared by the impact of the high-speed projectiles at the same time it is the light weight and flexible to adopt the shape suitable for the end applications; said method comprises:

i. manufacturing the thermoset composite layer (a) by either compression moulding the powder of the waste hybrid composites along with epoxy resin system or hot pressing of ceramic into predefined shaped blocks followed by interlocking a first set of blocks with a second set of blocks through operatively downward sloping and outward facing planar surfaces;

ii. manufacturing the layer (b) comprising at least one layer comprising several hexagonal units of glass fabric impregnated with the epoxy resin system being surface treated with bonding agent arranged in a X-Y plane direction fused with a thin layer of compounded rubber by an impregnating a glass fabric with an epoxy resin system followed by compression moulding or punching to obtain hexagonal units, surface treating of the hexagonal units with a bonding agent, arranging the several hexagonal units surface treated with the bonding agent in X-Y plane direction where two edges of each hexagonal unit share with two immediate adjacent hexagonal units in X-direction while remaining four edges share with four immediate adjacent hexagonal units placed vertically in the Y-direction to form a layer comprising several hexagonal units, placing one thin layer of the compounded rubber over the layer comprising several hexagonal units and fusing the layer comprising several hexagonal units and the thin compounded rubber by compression moulding or manufacturing the layer (b) comprising at least two layers comprising several hexagonal units of glass fabric impregnated with the epoxy resin system being surface treated with bonding agent arranged in X-Y plane direction fused with a thin layer of compounded rubber by impregnating a glass fabric with epoxy resin system followed by compression moulding or punching to obtain hexagonal units, surface treating of the hexagonal units with a bonding agent, arranging the several hexagonal units surface treated with the bonding agent in X-Y plane direction where two edges of each hexagonal unit share with two immediate adjacent hexagonal units in X-direction while remaining four edges share with four immediate adjacent hexagonal units placed vertically in the Y-direction to form a lower and an upper layer comprising several hexagonal units, placing one thin layer of the compounded rubber over the lower layer followed by placing the upper layer to overlap the lower layer in such a manner that each common vertex of three adjacent hexagonal units of upper layer superimposing at the centre of the hexagonal unit of the lower layer without deviating X-Y plane arrangement and fusing the upper layer, the thin compounded rubber middle layer and the lower layer by compression moulding;

iii. manufacturing the composite layer (c) by surface treating the layers of used HDPE woven bags and/or sacks with the solvent-based elastomeric adhesive, placing the multiple layers of the surface treated of used HDPE woven bags and/or sacks over each other followed by compressing and fusing the multiple layers to form one layer or by placing the multiple layers of used HDPE woven bags and/or sacks over each other followed by stitching to form one layer, superimposing the multiple layers of recycled PET bottles felt or mat over each other followed by stitching to form a second layer and superimposing the one layer of compressed and fused surface treated multiple layers of HDPE woven bags or sacks or stitched multiple layers of HDPE woven bags or sacks over the second layer of the stitched multiple layers of recycled PET bottles felt or mat followed by stitching them together;

iv. manufacturing a planar composite layer (d) by encapsulating the synthetic polyester felts impregnated with a resin system as core with bi-directionally and/or uni-directionally oriented synthetic fabric selected from polyester, carbon, aramid, glass, basalt and mixtures thereof impregnated with a resin system by pultrusion or filament winding method; and v. encapsulating at least three layers prepared according to the steps (i) to (iv) in predefined sequence with a fabric as an upper or a superior layer followed by stitching the fabric to form the composite product.

Typically, the powder of the waste hybrid composite used in the step (a) is generated during the trimming of hybrid composite while manufacturing or during the end applications. Instead of the waste hybrid composite, the fresh hybrid composite may also be used in the present invention.

Typically, the step (i) compression moulding the powder of the waste hybrid composites into predefined shaped blocks is carried out by mixing the powder with the epoxy resin system in the ratio of 50 to 70:30 to 50 (volume/volume) i.e. (vol./vol.) followed by compression moulding by applying force of 1500 Kgf to 2000 Kgf.

Typically, the step (i) hot pressing of ceramic into predefined shaped blocks is carried out at temperature in the range of 2128 to 2203° C. and by applying force of 30 to 40 MPa.

The powder of the waste composite used in the step (a) is powder of the waste composite comprising the core of waste synthetic polyester felts impregnated with the resin system and the core is encapsulated between bi-directionally and/or uni-directionally oriented synthetic fabric selected from polyester, carbon, aramid, glass, basalt and mixtures thereof impregnated with the resin system.

The hexagonal units used in the step (ii) has at least 3 mm of thickness and 28 mm of diameter. The bonding agent used to treat the surface of hexagonal units includes examples but not limited to Chemlok® bonding agent. The thin layer of the compounded rubber used in the step (ii) is 1 mm thick and calendered compounded rubber. The compounded rubber is either natural or synthetic. The upper and the lower layer composed of the several hexagonal units which are surface treated with the bonding agent used in the step (b) has a thickness of at least 6 mm. Typically, the overlapping of the layers in the step (b) and compression moulding to fuse the upper layer the several hexagonal units which are surface treated with the bonding agent, the thin compounded rubber middle layer and the lower layer the several hexagonal units which are surface treated with the bonding agent are carried out very carefully without deviating X-Y plane arrangement to form the second layer.

The layers of used HDPE woven bags and/or sacks are surface treated with the solvent-based elastomeric adhesive layer. These surfaces treated multiple layers of HDPE woven bags and/or sacks with the solvent-based elastomeric adhesive are overlapped and compressed to fuse layers to form the layer of compressed and fused used HDPE woven bags and/or sacks with the solvent-based elastomeric adhesive layer. Alternatively, multiple layers of HDPE woven bags and/or sacks are overlapped and stitched together to form the layer. The multiple layers of recycled PET bottles felt or mat are overlapped and stitched together to form stitched recycled PET bottles felt or mat layer.

In one of the embodiments of the invention, the compressed and fused multiple layers of used HDPE woven bags and/or sacks with the solvent-based elastomeric adhesive layer or the stitched multiple layers of used HDPE woven bags and/or sacks as the upper layer is superimposed over the stitched multiple layers of recycled PET bottles felt or mat as the lower layer followed by stitching them together to form the layer (c) in the step (iii).

In another embodiment of the invention, the stitched multiple layers of recycled PET bottles felt or mat as the upper layer is superimposed over the compressed and fused multiple layers of used HDPE woven bags and/or sacks with the solvent-based elastomeric adhesive layer or the stitched multiple layers of used HDPE woven bags and/or sacks as the lower layer followed by stitching them together to form the layer (c) in the step (iii).

In yet another embodiment of the invention, the compressed and fused multiple layers of used HDPE woven bags and/or sacks with the solvent-based elastomeric adhesive layer or the stitched multiple layers of used HDPE woven bags and/or sacks as a first layer and stitched multiple layers of recycled PET bottles felt or mat as a second layer; said first layer and said second layer are arranged in alternate manner and these layers are stitched them together to form the layer (c) in the step (iii).

The recycled waste PET bottles felts or mats has 500 GSM. The solvent-based elastomeric adhesive used in the third layer is any liquid elastomeric adhesive including but not limited to SPEB-7. The layer (c) has a thickness of at least 8 mm.

The fabric used in the step (e) is either natural fabric or synthetic fabric including but not limited to cotton, nylon, terylene, polyester, rubberized fabric, blends, etc.

Typically, the predefined sequences of the layers (a) to (d) in the composite product of the invention are as follows: First predefined sequence is the layer (a) being first layer made up of powder of the waste hybrid composites, the layer (d) being second layer backing the first layer and the layer (c) being third layer backing the second layer. Second predefined sequence is the layer (a) being first layer made up of ceramic, the layer (d) being second layer backing the first layer and layer (c) being third layer backing the second layer. Third predefined sequence is the layer (b) made up of at least one layer comprising several hexagonal units of glass fabric impregnated with the epoxy resin system being surface treated with bonding agent arranged in X-Y plane direction fused with the thin layer of compounded rubber being first layer, the layer (d) being second layer backing the first layer and the layer (c) being third layer backing the second layer; and Fourth predefined sequence is the layer (b) comprised of at least two layers comprising several hexagonal units of glass fabric impregnated with the epoxy resin system being surface treated with bonding agent arranged in X-Y plane direction fused with the thin layer of compounded rubber being first layer, the layer (d) being second layer backing the first layer and layer (c) being third layer backing the second layer.

Typically, the composite product of the invention prepared according to the method of the invention has a thickness of at least 22 mm.

Typically, the composite product of the invention prepared according to the method of the invention is a light weight product with the weight that does not exceed 22 to 38 kg/m2 and is flexible to adopt a predefined shape suitable for end applications.

Typically, the composite product of the invention prepared according to the method of the invention substantially reduced the impact force imposed by hard impactor which travelled at the speed in the range of 400 m/s to 1400 m/s simultaneously damping the vibrations and shocks appeared therein.

Thus, the composite product of the invention prepared according to the method of the invention substantially reduces the impact force of the high-speed projectile and damps the vibrations and shock appeared by the impact of the high-speed projectile at the same time it is light weight and flexible to adopt a predefined shape suitable for end applications.

The structure and construction steps of all four layers and the manner in which they are manufactured induce the improved damping behaviour and impact strength to the product. The overall structure and the manner in which they are manufactured of the composite product induces flexibility to adopt to the shape suitable for end applications and also results into light weight.

The composite product of the invention is manufactured by using the wastes such as recycled polyethylene terephthalate (PET) bottle felts, used HDPE woven bags or sacks and powder of the waste hybrid composites which makes the composite product of the invention eco-friendly and cost-effective.

The present invention is described in the examples given below; further, these are provided only to illustrate the invention and therefore should not be construed to limit the scope of the invention.

Example 1. Manufacture of Layer (a) of Hybrid Composite (ah)

The powder of the waste of the hybrid composites of the example 6 of the Indian Patent Application no. 201621020446 was collected during the manufacturing while trimming the product. The powder was mixed with epoxy resin system (LAPOX® L-12/K-6, Epoxy resin system comprises epoxy resin and hardener in 100:10 ratio) in the ratio of 70:30 (vol./vol.). This waste powder was converted into predefined shaped blocks of FIG. 1A by compression moulding by applying force of 1620 Kgf in the die. Each block has thickness of 12 mm. The blocks were divided into two sets. One set of blocks was interlocked with the second set of blocks through operatively downward sloping and outward facing planar surfaces to obtain the layer (ah). The thickness of the layer (ah) was 12 mm.

Example 2. Manufacture of Layer (a) of Ceramic i.e. (ac)

Ceramic composition used has Boron content 81%, Iron 0.5% and 18.5% of Carbon. The ceramic composition used has density of 2.47-2.52 gm/cc, elastic Modulus of 430 GPa and micro hardness of 3000 GPa. Ceramic composition was converted into predefined shaped blocks of FIG. 1A by hot pressing at temperature of 2150° C. and force of 34 MPa. Each block has thickness of 4 mm. The blocks were divided into two sets. One set of blocks was interlocked with the second set of blocks through operatively downward sloping and outward facing planar surfaces to obtain the layer (ac). The thickness of the layer (ac) was 4 mm.

Example 3

Manufacture of layer (b) of at least one layer comprising several hexagonal units of glass fabric impregnated with epoxy resin being surface treated with bonding agent arranged in X-Y plane direction fused with a thin layer of compounded rubber i.e. (b1):

The glass fabric of 360 GSM was impregnated with epoxy resin system (LAPOX® L-12/K-6, Epoxy resin system comprises epoxy resin and hardener in 100:10 ratio) to obtain the impregnated glass fabric having the fabric to the epoxy resin system ratio of 60:40 (vol./vol.). Thirty (30) numbers impregnated fabric layers were superimposed over each other and subjected to compression moulding at a force of 6500 Kgf to obtain hexagonal units of 6 mm thickness and 28 mm of diameter. These hexagonal units were surface treated with a bonding agent, Chemlok®. These surface treated hexagonal units were arranged in the X-Y plane direction where two edges of each hexagonal unit share with two immediate adjacent hexagonal units in X-direction while remaining four edges share with four immediate adjacent hexagonal units placed vertically in the Y-direction to form a layer. The thickness of the layer comprising multiple hexagonal units arranged in X-Y plane direction was 6 mm. Neoprene rubber was calendared to obtain 1 mm thick middle layer. The layer of the compounded rubber was arranged over the layer comprising multiple hexagonal units. Upon arrangement, these two layers were fused by compression moulding at 155° C. using 1200 psi pressure for 18 minutes to have 6 mm thick layer (b1).

Example 4

Manufacture of layer (b) comprised of at least two layers comprising several hexagonal units of glass fabric impregnated with the epoxy resin system being surface treated with bonding agent arranged in X-Y plane direction fused with the thin layer of compounded rubber i.e. (b2):

The glass fabric of 360 GSM was impregnated with epoxy resin system (LAPOX® L-12/K-6, Epoxy resin system comprises epoxy resin and hardener in 100:10 ratio) to obtain the impregnated glass fabric having the fabric to the epoxy resin system ratio of 60:40 (vol./vol.). Thirty (30) numbers impregnated fabric layers were superimposed over each other and subjected to compression moulding at a force of 6500 Kgf to obtain hexagonal units of 6 mm thickness and 28 mm of diameter. These hexagonal units were surface treated with a bonding agent, Chemlok®. These surfaces treated hexagonal units were arranged in the X-Y plane direction where two edges of each hexagonal unit share with two immediate adjacent hexagonal units in X-direction while remaining four edges share with four immediate adjacent hexagonal units placed vertically in the Y-direction to form two separate layers i.e. an upper layer and a lower layer. The thickness of the lower layer and the upper layer was 6 mm. Neoprene rubber was calendared to obtain 1 mm think middle layer. The middle layer of the rubber was arranged over the lower layer of several surface treated hexagonal units followed by arranging the several surface treated hexagonal units in the X-Y plane direction to form the upper layer to overlap the lower layer in such a manner that each common vertex of three adjacent hexagonal units of the upper layer was superimposed at the centre of the hexagonal unit of the lower layer without deviating X-Y plane arrangement. Upon the arrangement, the upper layer of the several surface treated hexagonal units, the middle rubber layer and the lower several surface treated hexagonal units were fused by compression moulding at 155° C. using 1200 psi pressure for 18 minutes to have 12 mm thick layer (b2).

Example 5

Manufacture of the composite layer (c1) comprised of stitched multiple layers of used HDPE woven sacks and stitched multiple layers of recycled PET bottles felt or mats:

Used HDPE woven sacks of 130 GSM were collected. Three numbers of sacks were arranged over each other and stitched to form one layer. The process was repeated to obtain one more layer.

The recycled/waste PET bottle felts having 500 GSM manufactured by CAPITOL Non Oven Private Ltd were used. Two felts were superimposed over each other followed by stitching to form the second layer. The process was repeated to obtain one more second layer.

The layer (c1) comprising the one layer of stitched multiple HDPE woven sacks being first layer was superimposed over the layer of stitched recycled PET bottles felt being second layer which was further superimposed over the one layer of stitched multiple HDPE woven sacks being third layer and finally superimposed over the layer of stitched recycled PET bottles felt being fourth layer in the alternate manner.

These four alternate layers were stitched to form the layer (c1) of thickness of 12 mm.

Example 6

Manufacture of layer (c2) comprised of compressed and fused multiple surface treated layers of used HDPE woven sacks with a solvent-based elastomeric adhesive layer and stitched multiple layers of recycled PET bottles felt or mats:

Used HDPE woven sacks having 130 GSM were collected and these sacks were surface treated with the solvent-based elastomeric adhesive namely SPEB-7. 24 number of surface treated sacks were arranged over each other and subjected them to compression to carry out fusion by applying manual pressure to form one layer. The process was repeated to obtain one more layer.

The recycled/waste PET bottle felts having 500 GSM manufactured by CAPITOL Non Oven Private Ltd were used. Two felts were superimposed over each other followed by stitching to form second layer. The process was repeated to obtain one more second layer.

The layer (c2) comprising the one layer of compressed and fused multiple surface treated layers of used HDPE woven sacks being first layer was superimposed over the layer of stitched recycled PET bottles felt being second layer.

These two layers were stitched together to form the layer (c2) of thickness of 8 mm.

Example 7. A Planar Composite Layer (d)

The fourth layer was made according to the example no. 6 of Indian Patent Application No. 201621020446. The core comprises of waste synthetic polyester felts of 500 GSM (manufactured from waste PET bottles by CAPITOL Non Oven Private Ltd) duly impregnated with resin system comprising 100 parts phenol formaldehyde (68 to 72% resole type phenol formaldehyde in water supplied by Shivam Polymer Pvt. Ltd.) and 20 parts methanol and the core was encapsulated with bi-directional glass fabric impregnated with the resin system comprising 100 parts phenol formaldehyde (68 to 72% resole type phenol formaldehyde in water supplied by Shivam Polymer Pvt. Ltd.) and 20 parts methanol by pultrusion method. The fourth layer has thickness of 10 mm. The fourth layer has 10% bidirectional glass fabric, 45% synthetic polyester felt and 45% resin system (vol./vol.)

Example 8. Manufacture Composite Product

Three layers as illustrated in Table 1 were arranged in the predefined sequence as per Table 1 by placing them over one another. Third layer was placed as last layer over which second layer and first layer were placed over each other in the sequence so that first layer was backed by second layer which was further backed by the third layer. These arranged layers were encapsulated in the defined sequence by a cotton fabric as an upper or a superior layer. The fabric was stitched to enclose predefined sequence of layer to form the number of composite products.

TABLE 1

Number of the composite products with predefined sequences with thickness and weight

| Composite products | Predefined sequence | Thickness (mm) | Weight (Kg/m2) |
|---|---|---|---|
| 1 | First layer = $a^h$ + Second layer = d + Third layer = $c^1$ | 34 | 28.0 |
| 2 | First layer = $a^h$ + Second layer = d + Third layer = $c^2$ | 30 | 32.0 |
| 3 | First layer = $a^C$ + Second layer = d + Third layer = $c^1$ | 26 | 22.7 |
| 4 | First layer = $a^C$ + Second layer = d + Third layer = $c^2$ | 22 | 26.7 |

TABLE 1-continued

Number of the composite products with predefined sequences with thickness and weight

| Composite products | Predefined sequence | Thickness (mm) | Weight (Kg/m2) |
|---|---|---|---|
| 5 | First layer = $b^1$ + Second layer = d + Third layer = $c^1$ | 28 | 24.0 |
| 6 | First layer = $b^1$ + Second layer = d + Third layer = $c^2$ | 24 | 28.0 |
| 7 | First layer = $b^2$ + Second layer = d + Third layer = $c^1$ | 34 | 33.3 |
| 8 | First layer = $b^2$ + Second layer = d + Third layer = $c^2$ | 30 | 37.3 |

The products were tested by using high speed projectile of dimensions 9×19, 7.62×39, and 7.62×51 travelling with velocity of 430±15, 635±15, and 838±15 from the distance of 5 meters, 10 meters, and 10 meters respectively. The test was conducted at room temperature of 30° C. and at humidity level of 46%.

The results were illustrated in Table 2.

TABLE 2

Test results of Impacts and flexibility

| Composite products | Predefined sequence | Dimension of projectile | Angle of Firing | Velocity of the projectile (m/sec) | Penetration/No Penetration | Flexibility |
|---|---|---|---|---|---|---|
| 1 | First layer = $a^h$ + Second layer = d + Third layer = $c^1$ | 9 × 19 | 90° | 432.1 | No Penetration | 2 shots |
| 2 | First layer = $a^h$ + Second layer = d + Third layer = $c^2$ | 9 × 19 | 90° | 434.1 | No Penetration | 2 shots |
| 3 | First layer = $a^C$ + Second layer = d + Third layer = $c^1$ | 7.62 × 39 HSC | 90° | 642.4 | No Penetration | 2 shots |
| 4 | First layer = $a^C$ + Second layer = d + Third layer = $c^2$ | 7.62 × 39 HSC | 90° | 724.1 | No Penetration | 2 shots |
| 5 | First layer = $b^1$ + Second layer = d + Third layer = $c^1$ | 7.62 × 39 HSC | 90° | 640.4 | No Penetration | 2 shots |
| 6 | First layer = $b^1$ + Second layer = d + Third layer = $c^2$ | 9 × 19 | 90° | 431.2 | No Penetration | 2 shots |
| 7 | First layer = $b^2$ + Second layer = d + Third layer = $c^1$ | 7.62 × 39 MSC | 90°, | 723.1 | No Penetration | 2 shots |
| 8 | First layer = $b^2$ + Second layer = d + Third layer = $c^2$ | 7.62 × 51 | 90° | 846.5 | No Penetration | 2 shots |

We have found that multi-hit capability of the product has increased significantly when it is used in the predefined sequence as illustrated in Table 1 and Table 2 (i.e. Minimum shot to shot distance is 40 mm). The weak zones formed in traditional hexagons are overcome by the predefined shaped blocks of FIG. 1A of the present invention.

The invention claimed is:

1. A composite product comprising:
at least three layers selected from a thermoset layer, a glass layer, a composite layer, and a planar layer, wherein,
the thermoset layer is made of a powder of waste hybrid composites or waste ceramic, wherein the thermoset layer is planar and made up of interlocked, shaped blocks,
the glass layer includes,
at least one glass sublayer having a plurality of hexagonal units of glass fabric impregnated with an epoxy resin system, wherein the hexagonal units are surface treated with a bonding agent, arranged in an X-Y plane, and fused with a layer of compounded rubber, or
at least two of the glass sublayers including the plurality of hexagonal units fused with a middle layer of the compounded rubber,
the composite layer includes,
a first composite sublayer having, multiple fused layers of HDPE with a solvent-based elastomeric adhesive layer, or multiple stitched layers of HDPE, and
a second composite sublayer of the composite layer having multiple stitched layers of PET, and
the planar layer is made of a composite core of synthetic polyester felt impregnated with a first resin system, wherein the core is encapsulated between bi-directionally and/or uni-directionally-oriented synthetic fabric selected from at least one of, polyester, carbon, aramid, glass, and basalt, and impregnated with a second resin system; and
an upper superior layer of a fabric encapsulating the at least three of the thermoset layer, the glass layer, the composite layer, and the planar layer, wherein the composite product is configured to reduce impact force of high-speed projectiles and damp vibrations and shock from impact of the high-speed projectiles.

2. The composite product of claim 1, wherein the composite product has a thickness of at least 22 mm.

3. The composite product of claim 1, wherein the thermoset layer is 4 to 12 mm thick, the glass layer is 6 to 12 mm thick, the composite layer is at least 8 mm thick, and the planar layer is at least 8 mm thick.

4. The composite product of claim 1, wherein the interlocked, shaped blocks are at least 4 to 12 mm thick.

5. The composite product of claim 1, wherein the hexagonal units have at least 3 mm of thickness and 28 mm of diameter.

6. The composite product of claim 5, wherein the hexagonal units are arranged in the X-Y plane direction such that each hexagonal unit shares two edges with two adjacent hexagonal units extending in the X-direction and four edges with four adjacent hexagonal units extending in the Y-direction.

7. The composite product of claim 6, wherein the at least two of the glass sublayers are arranged in an upper layer and a lower layer, wherein the upper layer is arranged such that each common vertex of three adjacent hexagonal units of the upper layer overlaps a center of the hexagonal unit of the lower layer.

21

8. The composite product of claim 7, wherein the first and the second composite sublayers are stitched together.

9. The composite product of claim 1, wherein the compounded rubber is either only a natural or only a synthetic rubber.

10. The composite product of claim 1, wherein the first and the second composite sublayers are stitched together.

11. The composite product of claim 10, wherein the PET layers have 500 grams per square meter.

12. The composite product of claim 1, wherein the fabric of the upper superior layer includes at least one of, cotton, nylon, terylene, polyester, and rubberized fabric.

13. A composite product comprising:
- at least three layers selected from a thermoset layer, a glass layer, a composite layer, and a planar layer, wherein,
  - the thermoset layer is made of a powder of waste hybrid composites or waste ceramic,
  - the glass layer includes,
    - at least one glass sublayer having a plurality of hexagonal units of glass fabric impregnated with an epoxy resin system, wherein the hexagonal units are surface treated with a bonding agent, arranged in an X-Y plane, and fused with a layer of compounded rubber, or

22

- at least two of the glass sublayers including the plurality of hexagonal units fused with a middle layer of the compounded rubber,
  - the composite layer includes,
    - a first composite sublayer having, multiple fused layers of HDPE with a solvent-based elastomeric adhesive layer, or multiple stitched layers of HDPE, and
    - a second composite sublayer of the composite layer having multiple stitched layers of PET, and
  - the planar layer is made of a composite core of synthetic polyester felt impregnated with a first resin system, wherein the core is encapsulated between bi-directionally and/or uni-directionally-oriented synthetic fabric selected from at least one of, polyester, carbon, aramid, glass, and basalt, and impregnated with a second resin system; and
- an upper superior layer of a fabric encapsulating the at least three of the thermoset layer, the glass layer, the composite layer, and the planar layer, wherein the composite product has a weight lower than 38 kg/m2 and a thickness of at least 22 mm, and wherein the composite product is configured to reduce an impact force imposed by a hard impactor travelling at a speed of 400 m/s to 1400 m/s while simultaneously damping vibrations and shocks from the impact therein.

* * * * *